United States Patent [19]

Tarusawa et al.

[11] Patent Number: 5,676,341
[45] Date of Patent: Oct. 14, 1997

[54] VEHICLE SEAT SLIDE MECHANISM

[75] Inventors: Makoto Tarusawa; Yoshiharu Shinmoto, both of Hiroshima-ken, Japan

[73] Assignee: Delta Kogyo Co., Ltd., Hiroshima-ken, Japan

[21] Appl. No.: 613,645

[22] Filed: Mar. 11, 1996

[30] Foreign Application Priority Data

Mar. 20, 1995 [JP] Japan .................. 7-060507

[51] Int. Cl.$^6$ .................................................. B60N 2/02
[52] U.S. Cl. .................................. 248/430; 296/65.1
[58] Field of Search ........................... 248/429, 430; 296/65.1; 297/344.1, 344.13

[56] References Cited

U.S. PATENT DOCUMENTS

| | | |
|---|---|---|
| 4,526,424 | 7/1985 | Korth . |
| 4,597,552 | 7/1986 | Nishino ............................. 248/429 |
| 4,642,318 | 2/1987 | Fussnegger et al. ............... 248/430 X |
| 4,811,925 | 3/1989 | Fujita et al. ....................... 248/430 |
| 4,821,991 | 4/1989 | Aihara et al. . |
| 5,028,028 | 7/1991 | Yamada et al. . |
| 5,137,244 | 8/1992 | Negi ................................ 248/430 |
| 5,192,045 | 3/1993 | Yamada et al. .................... 248/430 |

FOREIGN PATENT DOCUMENTS 0 076 041    4/1983    European Pat. Off. .

*Primary Examiner*—Ramon O. Ramirez
*Assistant Examiner*—Derek J. Berger
*Attorney, Agent, or Firm*—Wenderoth, Lind & Ponack

[57] ABSTRACT

A vehicle seat slide mechanism includes a lower rail and an upper rail slidably mounted on the lower rail for movent relative thereto. The lower rail includes a bottom wall, first and second side walls extending in a direction perpendicular to the bottom wall, first and second top walls extending inwardly from respective top edges of the first and second side walls and terminating spaced a distance from each other, and a dependent wall extending towards the bottom wall from the first top wall. On the other hand, the upper rail includes an upright wall lying perpendicular to the lower rail, a bottom wall generally perpendicular to the upright wall and extending widthwise of the upper rail, and an upturned wall extending upwardly from the bottom wall of the upper rail. First and second plurality of balls are accommodated rollingly within opposite spaces on respective sides of the upper rail to facilitate a smooth movement of the upper rail relative to the lower rail.

7 Claims, 7 Drawing Sheets

VEHICLE SEAT SLIDE MECHANISM

BACKGROUND OF THE INVENTION

1. Field of the Invention

The present invention generally relates to a vehicle seat slide mechanism for supporting a vehicle seat assembly for adjustment to and fro.

2. Description of Related Art

A vehicle seat slide mechanism is largely employed in automotive vehicles for permitting a seat occupant to adjust the position of the seat assembly in a direction longitudinally of a vehicle to secure a comfortable sitting position. This vehicle seat slide mechanism is currently available in numerous types such as disclosed in, for example, U.S. Pat. No. 4,526,424, issued Jul. 2, 1985, European Patent No. 76,041, granted Mar. 19, 1986, U.S. Pat. No. 4,821,991, issued Apr. 18, 1989, and U.S. Pat. No. 5,028,028, issued Jul. 2, 1991.

U.S. Pat. No. 4,526,424 discloses a vehicle seat slide mechanism which comprises at least one telescopic seat slide rail assembly including a lower rail of a shape generally similar to the inverted shape of a figure "U" secured at its opposite ends to a vehicle floor and having first and second legs joined together by means of a curved top wall, and an upper rail slidably mounted on the lower rail. The upper rail has first and second legs connected together by means of a top wall so as to render the upper rail to represent a shape generally similar to the inverted shape of a figure "U". At least one of the legs of the upper rail has a lower portion curled backwards to define a groove for receiving the corresponding leg of the lower rail. A different embodiment disclosed in this U.S. patent discloses both of the legs of the upper rail curled backwards to define respective grooves for receiving the associated legs of the lower rail.

In this rail assembly disclosed in U.S. Pat. No. 4,526,424, a plurality of slide elements or rollers are interposed between the top wall of the upper rail and the curved top wall of the lower rail to facilitate a sliding movement of the upper rail relative to the lower rail. Thus, in the prior art vehicle seat slide mechanism disclosed in U.S. Pat. No. 4,526,424, the lower rail slidably supports the upper rail through the slide elements or rollers with the legs of the lower rail received within the respective grooves in the upper rail.

It has, however, been found that since the legs of the lower rail are so loosely received within the respective grooves in the upper rail, the upper rail may, during its sliding movement relative to the lower rail, displace laterally in a direction perpendicular to the lengthwise direction of the lower rail. This is particularly true where a relatively large lateral load acts on the upper rail during the sliding movement relative to the lower rail, resulting in a rattling motion of the upper rail relative to the lower rail. This rattling motion accompanies generation of rubbing and/or hitting sounds as a result of frictional contact between the legs of the lower rail and the walls defining the grooves in the upper rail to such an extent that the seat occupant may have an uncomfortable operating sensation.

SUMMARY OF THE INVENTION

Accordingly, the present invention has been devised to provide an improved vehicle seat slide mechanism of a type effective to accomplish a smooth and quiet slide movement of the upper rail relative to the lower rail without accompanying any lateral displacement therebetween.

Another important object of the present invention is to provide an improved vehicle seat slide mechanism of the type referred to above, which is substantially free from any obnoxious rattling motion and allows the seat occupant to have a comfortable operating sensation.

In order to accomplish these and other objects of the present invention, one aspect of the present invention provides a vehicle seat slide mechanism including a lower rail and an upper rail slidably mounted on the lower rail for movent relative thereto. The lower rail includes a bottom wall extending widthwise of the lower rail, first and second side walls extending a predetermined distance from respective opposite side edges of the bottom wall in a direction perpendicular to the bottom wall, first and second top walls extending a predetermined distance inwardly from respective top edges of the first and second side walls and terminating spaced a distance from each other, and a dependent wall extending towards the bottom wall from the first top wall. On the other hand, the upper rail mounted on the lower rail for telescopic movement relative to the lower rail includes an upright wall lying perpendicular to the lower rail, a bottom wall generally perpendicular to the upright wall and extending widthwise of the upper rail, and an upturned wall extending upwardly from the bottom wall of the upper rail.

The upper rail also includes first bulged portion defined at a junction between the upturned wall and the bottom wall of the upper rail so as to protrude laterally outwardly towards the first side wall of the lower rail, and a second bulged portion defined at a junction between the upright wall and the bottom wall of the upper rail so as to protrude laterally outwardly towards the second side wall of the upper rail. A first plurality of balls are accommodated rollingly within a the first space delimited by the first bulged portion, the upturned wall of the upper rail, the first side wall of the lower rail and the first top wall of the lower rail; and a second plurality of balls are accommodated rollingly within a second space delimited by the second bulged portion, the upright wall of the upper rail and the second side wall of the lower rail and the second top wall of the lower rail.

Each of the pluralities of the balls may be made of any suitable material, however the balls made of metal are preferred in terms of cost, durability and capability of providing a smooth sliding motion.

According to another aspect of the present invention, the lower rail includes a bottom wall extending widthwise of the lower rail, first and second side walls extending a predetermined distance from respective opposite side edges of the bottom wall in a direction perpendicular to the bottom wall, first and second top walls extending a predetermined distance inwardly from respective top edges of the first and second side walls and terminating spaced a distance from each other, and a dependent wall extending towards the bottom wall from the first top wall, whereas the upper rail comprises an elongated upper bracket and an elongated stopper bracket and mounted on the lower rail for telescopic movement relative to the lower rail.

The upper bracket includes an upright wall lying perpendicular to the lower rail, a bottom wall generally perpendicular to the upright wall and extending widthwise of the upper rail, and an upturned wall extending upwardly from the bottom wall of the upper rail, and the stopper bracket includes at least first and second side walls lying generally parallel to the first and second side walls of the lower rail. The balls are accommodated rollingly within a first space delimited by the second side wall of the lower rail, the second top wall of the lower rail, the second side wall of the stopper bracket and the upright wall of the upper bracket and also within a second space delimited by the first side wall of the lower rail, the first top wall of the lower rail, the first side wall of the stopper bracket and the upturned wall of the upper bracket.

In this instance, the first and second side walls of the stopper bracket may be secured to the upturned and upright walls of the upper bracket. Alternatively, the stopper bracket may be of one-piece construction including the first and second side walls and a bottom wall joining the first and second side walls together.

The stopper bracket may also include at least one lateral wing extending from one of respective upper edges of the first and second side walls of the stopper bracket so as to protrude towards the adjacent first or second side wall of the lower rail. Preferably, a surface area of each of the lateral wings which is held in contact with the metal balls is inwardly recessed to follow a curvature each metal ball so as to provide a surface-contact support for the metal balls. This is particularly advantageous in that the balls can be supported in a stabilized fashion.

In addition, the vehicle seat slide mechanism generally includes a seat slide lock mechanism for locking the seat assembly once the latter has been repositioned. Therefore, the stopper bracket may have an engagement area for engagement with a lock plate which forms a part of the seat slide lock mechanism.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which.

DETAILED DESCRIPTION OF THE PREFERRED EMBODIMENTS

Figure 1:
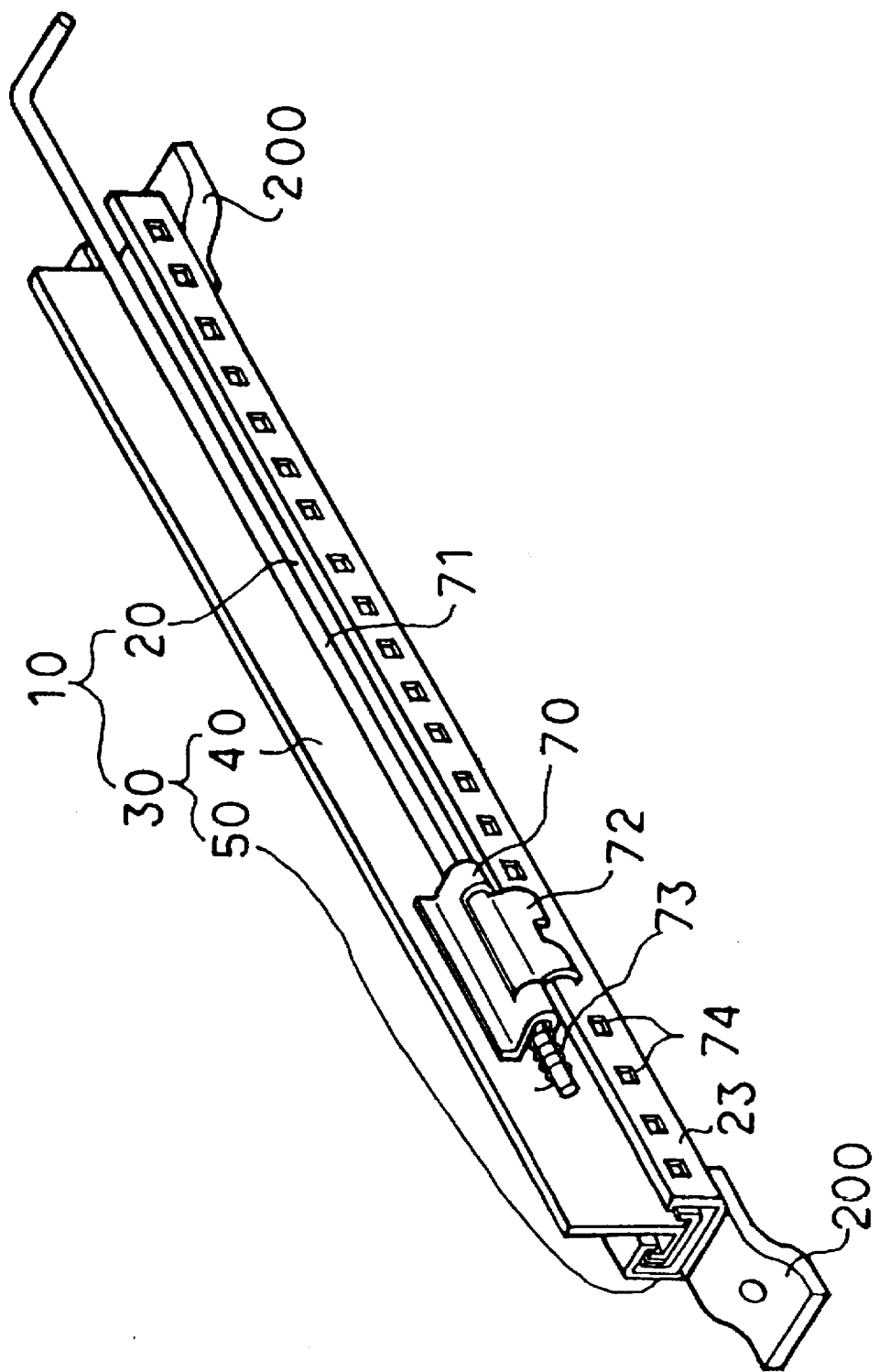
FIG. 1 is a schematic perspective view of a telescopic slide rail assembly used in a vehicle seat slide mechanism according to a first preferred embodiment of the present invention.

Before the description of preferred embodiments of the present invention proceeds, it is to be noted that since the seat slide mechanism so far as employed in automotive vehicles generally comprises two slide rail assemblies, one on each side of a seat cushion, which are of an identical construction, reference will be made to only one of the slide rail assemblies in describing the preferred embodiment of the present invention. It is also to be noted that depending on the size of the seat to be supported by the seat slide mechanism for adjustment to and fro, the sole slide rail assembly would work satisfactory as the seat slide mechanism.

Referring now to FIGS. 1 to 5, a seat slide mechanism according to a first preferred embodiment of the present invention comprises right and left slide rail assemblies 10, only one of which is shown for the sake of brevity. The slide rail assembly 10 comprises a lower rail 20 of a generally G-shaped cross-section and an upper rail 30 slidably received by the lower rail 20 in a manner as will be described later, said lower and upper rails 20 and 30 being operatively coupled with each other for telescopic movement relative to each other in a direction lengthwise of the slide rail assembly 10. In the instance as shown, the lower rail 20 is secured to a floor panel (not shown) of an automotive body structure by means of brackets 200 coupled to from and rear ends thereof whereas the upper rail 30 has a seat cushion (not shown) rigidly mounted thereon in a manner known to those skilled in the art.

Figure 3:
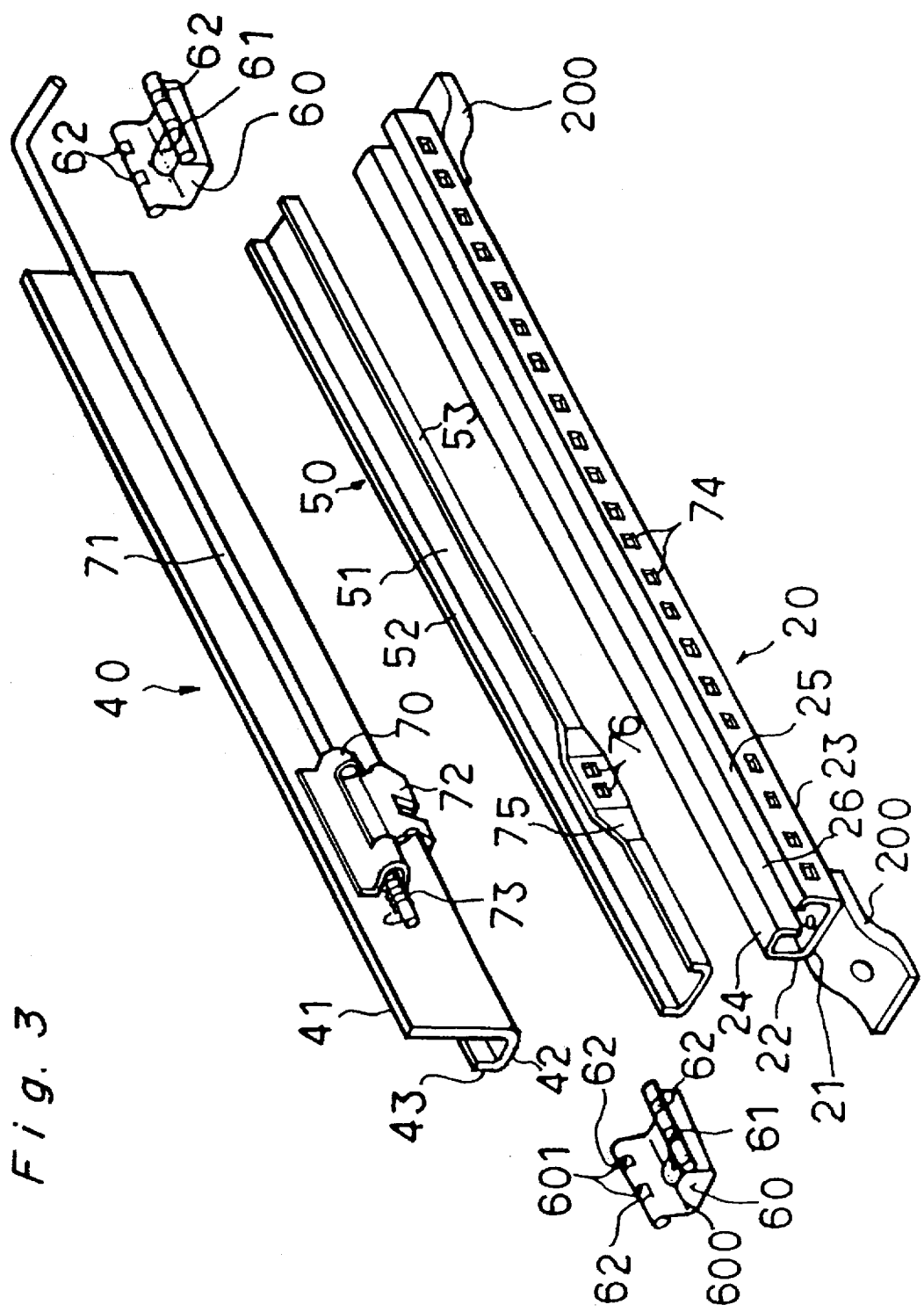
FIG. 3 is an exploded view of the slide rail assembly shown in FIG. 1.
Figure 4:
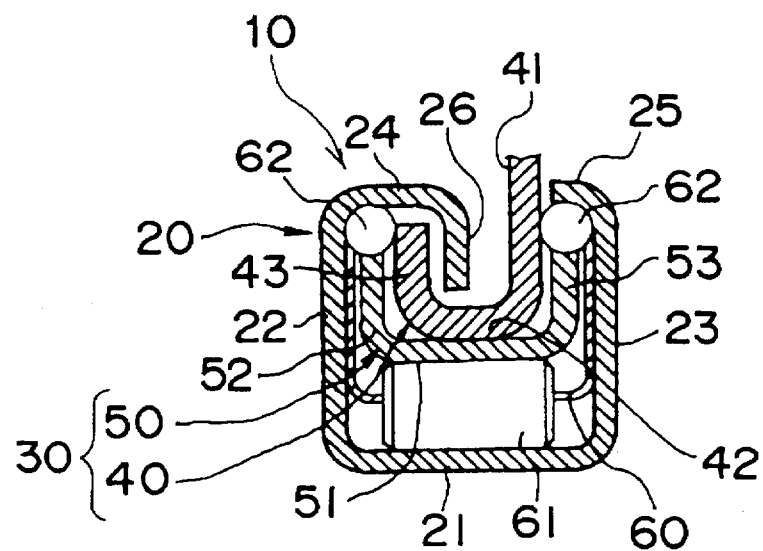
FIG. 4 schematic cross-sectional representation of a portion of the slide rail assembly shown in FIG. 1.
Figure 5:
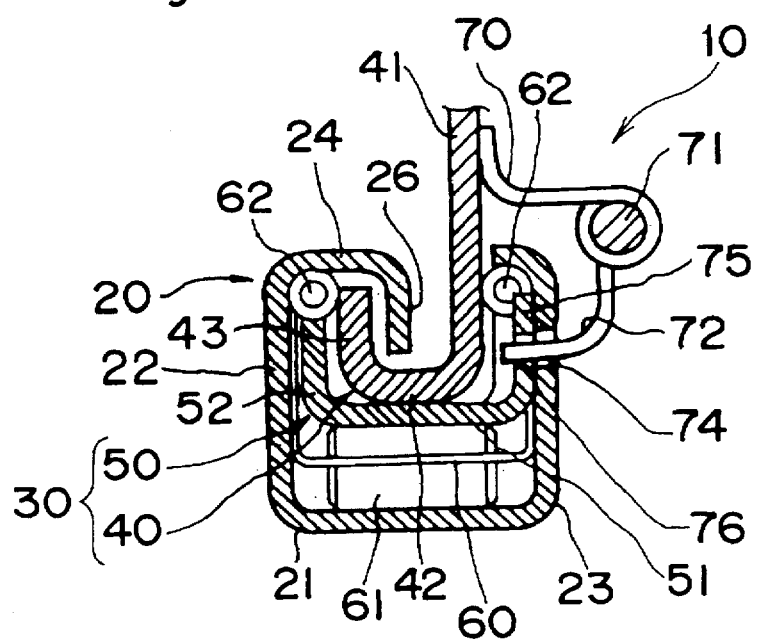
FIG. 5 is a schematic cross-sectional representation of a different portion of the slide rail assembly shown in FIG. 1.

As best shown in FIGS. 3 to 5, the lower rail 20 of the generally G-shaped cross-section includes a bottom wall 21 of a predetermined width, first and second side walls 22 and 23 extending a predetermined distance upwardly from respective opposite side edges of the bottom wall 21 in a direction perpendicular to the bottom wall 21, first and second top walls 24 and 25 extending a predetermined distance inwardly from respective top edges of the first and second side walls 23 and 24 and terminating spaced a distance from each other above the bottom wall 21, and a dependent wall 26 extending downwardly towards the bottom wall 21 from a free side edge of the first top wall 24 a distance smaller than the width of the adjacent side wall 22, all of said walls 21 to 26 being assembled together to render the lower rail 20 to represent a cross-sectional shape generally similar to the shape of a figure "G", leaving a longitudinal groove in the lower rail 20. It is to be noted that for the reason which will become clear later the second side wall 23 of the lower rail 20 is formed with a row of holes 74 defined therein and spaced equidistantly along the lengthwise direction thereof.

The upper rail 30 comprises an elongated upper bracket 40 of a generally J-shaped cross-section and an elongated stopper bracket 50 of a generally U-shaped cross-section joined or welded together with the upper bracket 40.

Similarly as best shown in FIGS. 3 to 5, the elongated upper bracket 40 which may have a length corresponding to and encompassed by the bottom size of the seat includes an upright wall 41 for firm connection with the seat cushion, a bottom wall 42 extending laterally from a lower edge of the upright wall 41 a distance smaller than the width of the bottom wall 21 of the lower rail 20, and an upturned wall 43 extending upwardly from a free edge of the bottom wall 42 a distance smaller than the width of the first side wall 22 of the lower rail 20, all of said walls 41 to 43 being assembled together to render the upper bracket 40 to represent a cross-sectional shape generally similar to the shape of a figure "J". On the other hand, the elongated stopper bracket 50 which may have a length corresponding to the upper bracket 40 includes a bottom wall 51 and first and second side walls 52 and 53 extending upwardly from respective opposite side edges of the bottom wall 51 in a direction perpendicular to the bottom wall 51, all of said walls 51 to 53 being assembled together to render the stopper bracket 50 to represent a cross-sectional shape generally similar to the shape of a figure "U". It is to be noted that, as best shown in FIG. 3, the second side wall 53 of the stopper bracket 50 has an engagement area 75 in which two lock holes 76 (FIG. 5) are defined therein and spaced from each other a distance equal to the distance of spacing between the neighboring holes 74 in the second side wall 23 of the lower rail 20.

The upper rail 30 is mounted on the lower rail 20 for sliding movement relative thereto in a direction lengthwise of the slide rail assembly 10. More specifically, the upper rail 30 is received in the lower rail 20 with the upright wall 41 extending upwardly through a gap between the first and second top walls 24 and 25 while the dependent wall 26 continued from the first top wall 24 protrudes into a generally U-shaped hollow delimited by the upright, bottom and upturned walls 41, 42 and 43.

Figure 2:
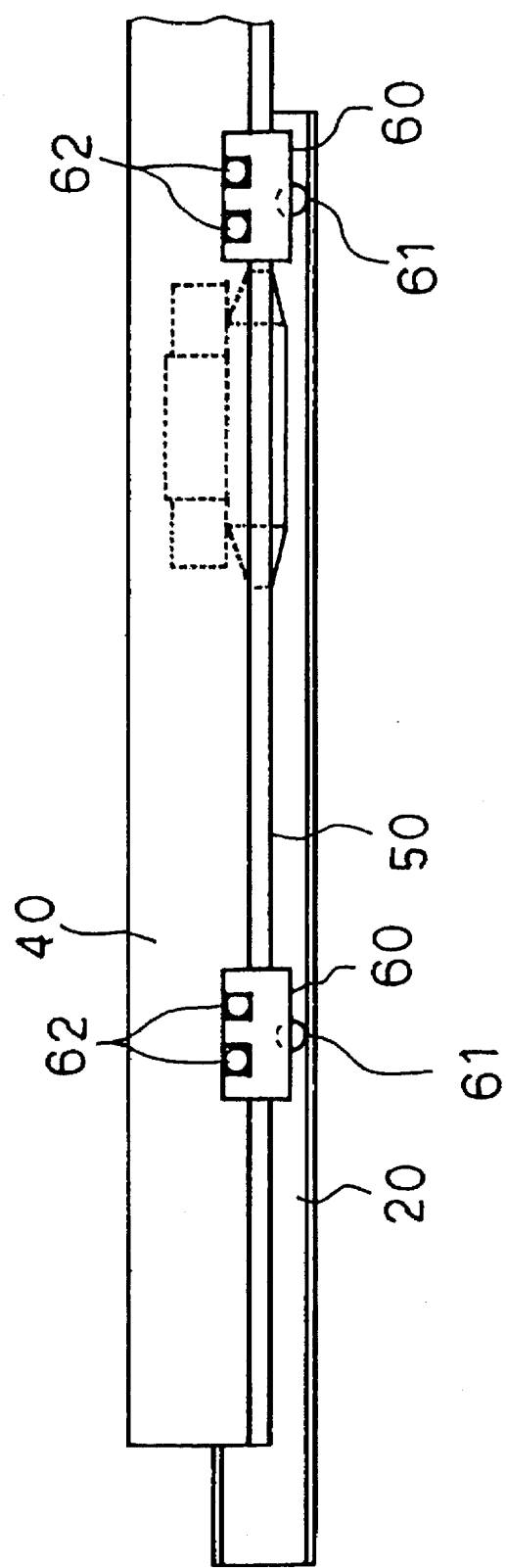
FIG. 2 is a side view of the slide rail assembly shown in FIG. 1.

As best shown in FIGS. 2 and 3, front and rear retainers generally identified by 60 are movably received within the longitudinal groove left in the lower rail 20 and disposed below opposite end portions of the stopper bracket 50. Each of the retainers 60 is of a generally U-shaped configuration having a bottom panel formed with a generally rectangular opening 600 for rotatably receiving therein at least one metal roller 61. The metal roller 61 rotatably carried in each of the retainers 60 is preferably of a cylindrical configuration having an axial length corresponding to the width of the bottom wall 51 of the stopper bracket 50 so that in a condition with the respective retainer 60 received within the longitudinal groove in the lower rail 20, the metal roller 61 can be interposed between the bottom wall 21 of the lower rail 20 and the bottom wall 51 of the stopper bracket 50. Thus, it will readily be seen that the metal rollers 61 in the respective retainers 60 allows one of the lower rail 20 and the upper rail 30 to slide axially relative to the other of the lower rail 20 and the upper rail 30 over a distance corresponding to the stroke of adjustment of the seat cushion.

Each of the retainers 60 also has spaced first and second side panels generally perpendicular to the bottom panel, each of said side panels having a top edge portion curled backwards so as to represent a generally round cross-sectional shape. The curled top edge portions of the side panels of each retainer 60 are formed with a plurality of, for example, two, bearing cutouts 601 for rotatably receiving therein corresponding metal balls 62.

In the assembled condition in which the respective retainers 60 are received within the longitudinal groove in the lower rail 20 with the metal rollers 61 interposed between the bottom wall 21 of the lower rail 20 and the bottom wall 51 of the stopper bracket 50, the metal balls 62 carried by the first side panel of each retainer 60 which movably lies between the first side wall 22 of the lower rail 20 and the first side wall 52 of the stopper bracket 40 are accommodated within a space delimited by the walls 22 and 24 of the lower rail 20, the first side wall 52 of the stopper bracket 40 and the upturned wall 43 of the upper bracket 40, and are held in rolling contact with respective inner surfaces of the walls 22 and 24 of the lower rail 20. Similarly, the metal balls 62 carried by the second side panel of each retainer 60 which movably lies between the second side wall 23 of the lower rail 20 and the second side wall 53 of the stopper bracket 40 are accommodated within a space delimited by the walls 23 and 25 of the lower rail 20, the second side wall 53 of the stopper bracket 50 and the upright wall 41 of the upper bracket 40, and are held in rolling contact with respective inner surfaces of the walls 23 and 25 of the lower rail 20 and also with the upright wall 41 of the upper bracket 40.

The upper bracket 40 also includes an adjustment rod 71 extending on one side of and along the upright wall 41. This adjustment rod 71 has one end portion rotatably carried by a mounting bracket 70 rigidly secured to the upright wall 41 at a location corresponding to the engagement area 75 in the second side wall 53 of the stopper bracket 50. The mounting bracket 70 rigid with the upright wall 41 has spaced-apart arms rotatably gripping the adjustment rod 71. A portion of the adjustment rod 71 between the arms of the mounting bracket 70 has a forked lock plate 72 mounted thereon for rotation together with the adjustment rod 71, which lock plate 72 forms a part of a known seat slide lock mechanism. The adjustment rod 71 is normally biased towards a lock position, as shown in FIGS. 1 and 5, about the longitudinal axis thereof by a torsion spring 73 that is mounted on that end of the adjustment rod 71. With the adjustment rod 71 so biased to the lock position, two pawls of the forked lock plate 72 extend through neighboring holes 74 in the second side wall 23 of the lower rail 20 and are then engaged in the lock holes 74 to lock the upper rail 30 relative to the lower rail 20.

To reposition the upper rail 30 relative to the lower rail 20, that is, to adjust the position of the seat assembly relative to the steering wheel, the adjustment rod 71 has to be turned against the torsion spring 73 to allow the pawls of the forked lock plate 72 to disengage from the lock holes 74 in the second side wall 53 of the stopper bracket 50. After the upper rail 30 has been repositioned relative to the lower rail 20, a turning force applied to the adjustment rod 71 should be released to automatically allow the forked lock plate 72 to assume to the lock position to thereby lock the upper rail 30 relative to the lower rail 20.

During the repositioning of the upper rail 30 accomplished in the manner described above, the upper rail 30 can slide smoothly relative to the lower rail 20 without accompanying any rattling motion since the upper rail 30 is stably supported by the metal rollers 61 and the pluralities of the metal balls 62. In other words, the upper rail 30 is stably supported by the lower rail 20 by means of the metal rollers 61 supporting it from below and the pluralities of the metal balls 62 supporting it from lateral directions and, therefore, even though an excessive lateral load acts on the upper rail 30 during the sliding motion of the latter relative to the lower rail 20, not only can the possibility of the rails 20 and 30 undergoing a rattling motion relative to each other be minimized advantageously, but generation of abnormal sounds such as a rubbing sound and a hitting sound can also be minimized.

Sliding motion of the upper rail 30 relative to the lower rail 20 takes place smoothly with the upper rail 30 having been guided by the metal rollers 61 and the metal balls 62 and, therefore, the seat occupant can have a comfortable operating sensation.

Also, a relatively large load which would act on the upper rail 30 can advantageously be distributed smoothly to the lower rail 20 through the metal rollers 61 and the metal balls 62, with the seat slide mechanism consequently accompanied by an increased reliability in counteracting against the relatively large load. Considering that the dependent wall 26 of the lower rail 20 and the walls 43 in the upper rail 30 are disposed so as to be engageable with each other, the physical strength of the slide rail assembly 10 can be increased advantageously. In particular, considering that the upper rail 30 comprises the upper bracket 40 and the stopper bracket 50 joined together, the metal balls 62 can be assuredly retained by the stopper bracket 50 and, also, the physical strength of the upper rail 30 can further be increased by securing the lock plate 72 thereto.

Structurally, the slide rail assembly 10 comprises a minimized number of component parts such as the upper rail 30, the lower rail 20 and the retainers 60. Therefore, not only is the slide rail assembly 10 simple and compact in structure, but also it has a light-weight feature.

Figure 6:
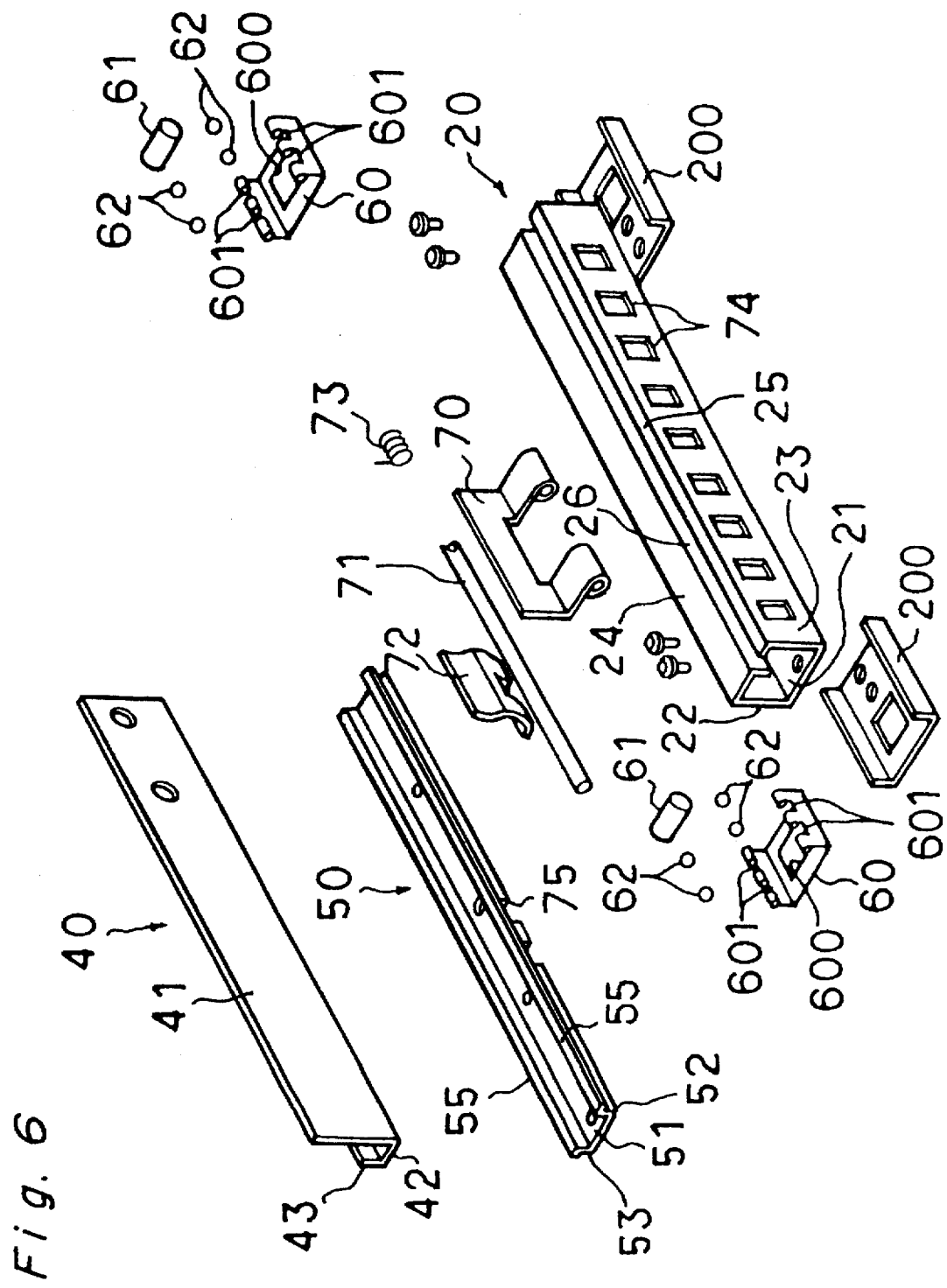
FIG. 6 is an exploded view of the slide rail assembly according to a second preferred embodiment of the present invention.
Figure 7:
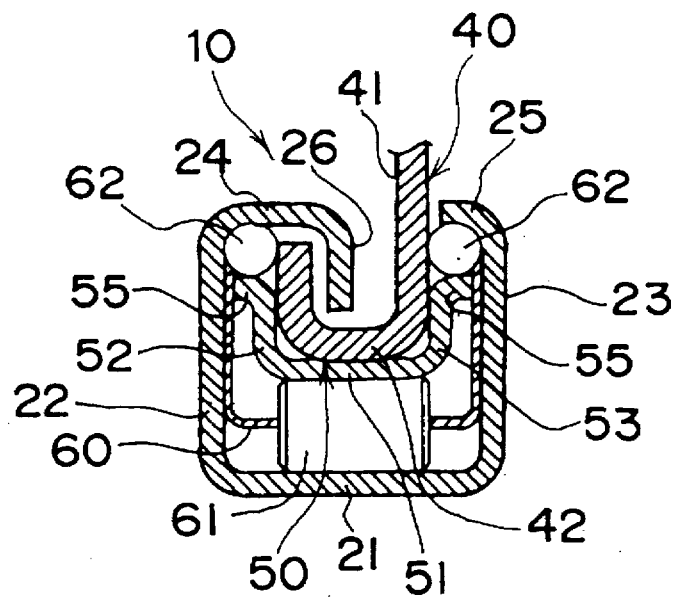
FIG. 7 is a view similar to FIG. 4, showing the slide rail assembly shown in FIG. 6.

In the foregoing embodiment, the stopper bracket 50 has been shown and described as having a generally U-shaped cross-section over the entire length thereof. However, according to a second preferred embodiment of the present invention shown in FIGS. 6 and 7, the stopper bracket 50 has first and second lateral wings 55 formed integrally therewith so as to protrude laterally outwardly from respective top free edges of the first and second side walls 52 and 53 of the stopper bracket 50 in a direction facing the adjacent first and second side walls 22 and 23 of the lower rail 20. The first and second lateral wings 55 provides a ball seat extending over the entire length of the stopper bracket 50 for the stabilized support of the metal balls 62. Preferably, a surface area of each of the lateral wings 55 which is held in contact with the metal balls 62 is inwardly recessed to follow a curvature each metal ball 62 so as to provide a surface-contact support for the metal balls 62.

In any one of the foregoing preferred embodiments of the present invention, the bottom wall 42 of the upper bracket 40 has been shown as resting on the metal rollers 61 through the bottom wall 51 of the stopper bracket 50 fast with the upper bracket 40 and, thus, during the sliding motion of the upper rail 30 relative to the lower rail 20, the bottom wall 51 of the stopper bracket 50 moves in rolling contact with the metal rollers 61 relative to the bottom wall 21 of the lower rail 20. However, the stopper bracket 50 may not be of the structure comprising a single component part such as described above in connection with any one of the foregoing embodiments of the present invention, but may comprise two separate component parts which will now be described with particular reference to FIG. 8.

Figure 8:
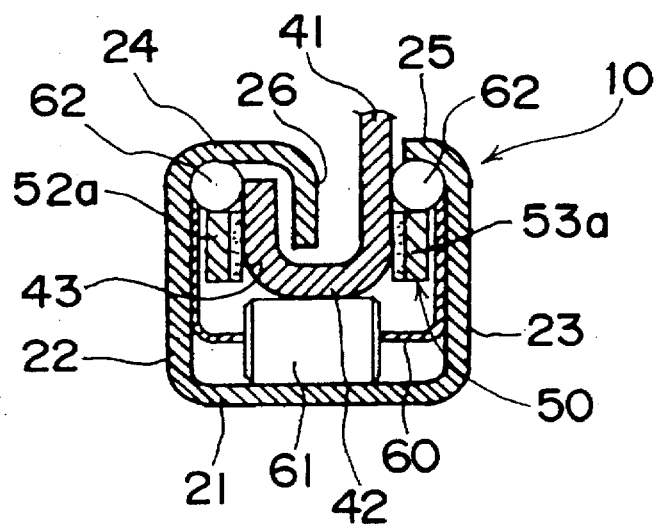
FIG. 8 is a view similar to FIG. 4, showing the slide rail assembly according to a third preferred embodiment of the present invention.

Referring now to FIG. 8 showing a third preferred embodiment of the present invention, the stopper bracket 50 comprises first and second transverse strips 52a and 53a separate from each other, each having a length corresponding to the length of the upper bracket 40. The first transverse strip 52a is fixedly secured, by welding or any other suitable joining method, to the upturned wall 43 of the upper bracket 40 so as to occupy a position between the upturned wall 43 and the first side wall 22 of the lower rail 20 whereas the second transverse strip 53a is similarly secured to the upright wall 41 of the upper bracket 40 so as to occupy a position between the upright wall 41 and the second side wall 23 of the lower rail 20.

In this third preferred embodiment of the present invention, the bottom wall 42 of the upper bracket 40 rests directly on the metal rollers 61 and, thus, during the sliding motion of the upper rail 30 relative to the lower rail 20, the bottom wall 41 of the upper bracket 40 moves in rolling contact with the metal rollers 61 relative to the bottom wall 21 of the lower rail 20.

It is to be noted that, in the third embodiment of the present invention shown in FIG. 8, the lock holes engageable with the pawls of the forked lock plate of the seat slide lock mechanism may be formed in one of the first and second transverse strips 52a and 53a, particularly the second transverse strip 53a, which is adjacent the second side wall 23 of the lower rail 20 where the lock holes 74 are formed.

Figure 9:
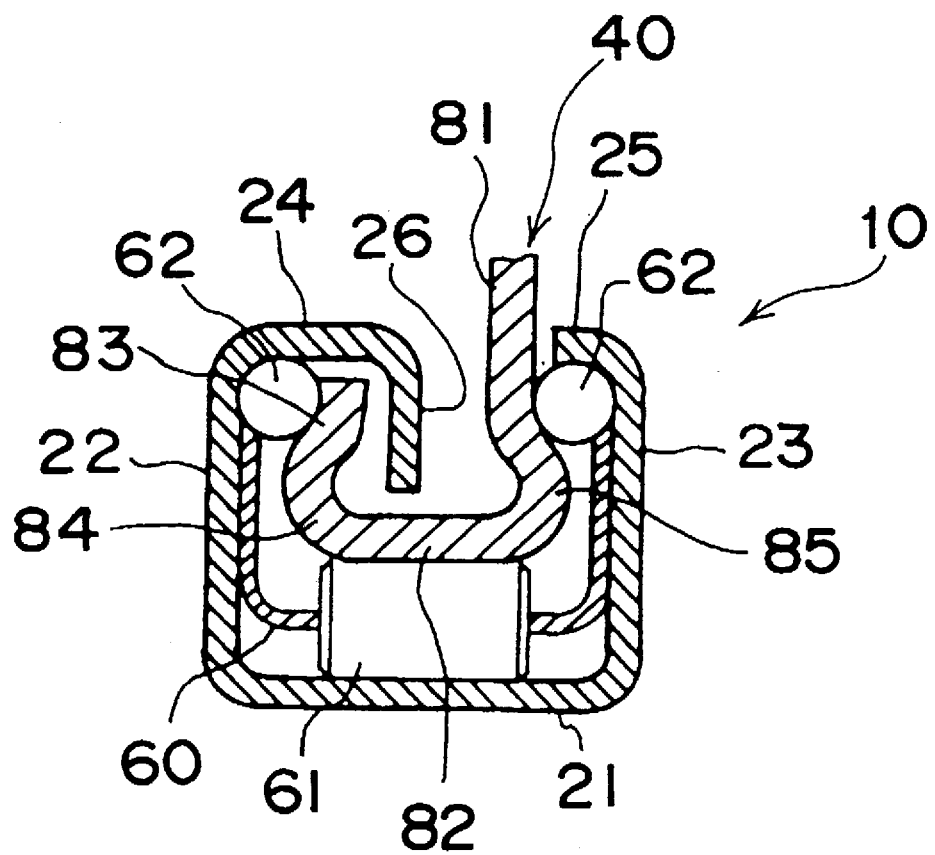
FIG. 9 is a view similar to FIG. 4, showing the slide rail assembly according to a fourth preferred embodiment of the present invention.

In a fourth preferred embodiment of the present invention which will now be described with reference to FIG. 9, the use of the stopper bracket employed in any one of the foregoing embodiments is dispensed with. For this purpose, the upper bracket 40 shown in FIG. 9 is of one-piece construction having a length corresponding to and encompassed by the bottom size of the seat. This upper bracket 40 includes an upright wall 81 for firm connection with the seat cushion, a bottom wall 82 generally perpendicular to the upright wall 81 and extending laterally therefrom a distance smaller than the width of the bottom wall 21 of the lower rail 20, and an upturned wall 83 extending upwardly from the bottom wall 82 a distance smaller than the width of the first side wall 22 of the lower rail 20, all of said walls 81 to 83 being assembled together to render the upper bracket 40 to represent a cross-sectional shape generally similar to the shape of a figure "J". A junction between the upturned wall 83 and the bottom wall 82 protrudes laterally outwardly towards the first side wall 22 of the lower rail 20 to define a first bulged portion 84 whereas a junction between the upright wall 81 and the bottom wall 82 similarly protrudes laterally outwardly towards the second side wall 23 to define a second bulged portion 85.

The first bulged portion 84 is so positioned and so configured as to cooperate with the upturned wall 83 of the upper rail 40 and the walls 22 and 24 of the lower rail 20 to define an elongated ball chamber in which the metal balls 62 carried by the retainers 60 are rollingly accommodated, whereas the second bulged portion 85 is so positioned and so configured as to cooperate with the upright wall 81 of the upper rail 40 and the walls 23 and 25 of the lower rail 20 to define an elongated ball chamber in which the metal balls 62 carried by the retainers 60 are rollingly accommodated.

The slide rail assembly 10 utilizing only the upper bracket 40 as described above with reference to FIG. 9 functions in a manner substantially similar to any one of the foregoing preferred embodiments of the present invention.

It is to be noted that, in the fourth embodiment of the present invention shown in FIG. 9, the lock holes engageable with the pawls of the forked lock plate of the seat slide lock mechanism may be formed in one of the first and second bulged portions 84 and 85, particularly the second bulged portion 85, which is adjacent the second side wall 23 of the lower rail 20 where the lock holes 74 are formed.

Although the present invention has been described in connection with the preferred embodiments thereof with reference to the accompanying drawings, it is to be noted that various changes and modifications are apparent to those skilled in the art. By way of example, although in describing any one of the various preferred embodiments of the present invention, the upper and lower rails 30 and 20 have been described and shown with the upper rail 30 positioned above the lower rail 20. However, the slide rail assembly 10 embodying the present invention may be utilized with the upper rail 30 positioned below the lower rail 20, i.e., in a manner reverse to that shown and described.

Such changes and modifications are to be understood as included within the scope of the present invention as defined by the appended claims, unless they depart therefrom.

What is claimed is:

1. A vehicle seat slide mechanism which comprises:
   a lower rail including a bottom wall extending widthwise of the lower rail, first and second side walls extending a predetermined distance from respective opposite side edges of the bottom wall in a direction perpendicular to the bottom wall, first and second top walls extending a predetermined distance inwardly from respective top edges of the first and second side walls and terminating spaced a distance from each other, and a dependent wall extending towards the bottom wall from the first top wall;

an upper rail mounted on the lower rail for telescopic movement relative to the lower rail and including an upright wall lying perpendicular to the lower rail, a bottom wall generally perpendicular to the upright wall and extending widthwise of the upper rail, and an upturned wall extending upwardly from the bottom wall of the upper rail;

said upper rail also including first bulged portion defined at a junction between the upturned wall and the bottom wall of the upper rail so as to protrude laterally outwardly towards the first side wall of the lower rail, and a second bulged portion defined at a junction between the upright wall and the bottom wall of the upper rail so as to protrude laterally outwardly towards the second side wall of the upper rail; and a first plurality of balls accommodated rollingly within a first space delimited by the first bulged portion, the upturned wall of the upper rail, the first side wall of the lower rail and the first top wall of the lower rail; and a second plurality of balls accommodated rollingly within a second space delimited by the second bulged portion, the upright wall of the upper rail and the second side wall of the lower rail and the second top wall of the lower rail.

2. A vehicle seat slide mechanism which comprises:

a lower rail including a bottom wall extending widthwise of the lower rail, first and second side walls extending a predetermined distance from respective opposite side edges of the bottom wall in a direction perpendicular to the bottom wall, first and second top walls extending a predetermined distance inwardly from respective top edges of the first and second side walls and terminating spaced a distance from each other, and a dependent wall extending towards the bottom wall from the first top wall;

an upper rail comprising an elongated upper bracket and an elongated stopper bracket and mounted on the lower rail for telescopic movement relative to the lower rail;

said upper bracket including an upright wall lying perpendicular to the lower rail, a bottom wall generally perpendicular to the upright wall and extending widthwise of the upper rail, and an upturned wall extending upwardly from the bottom wall of the upper rail;

said stopper bracket including at least first and second side walls lying generally parallel to the first and second side walls of the lower rail;

a first plurality of balls accommodated rollingly within a first space delimited by the second side wall of the lower rail, the second top wall of the lower rail, the second side wall of the stopper bracket and the upright wall of the upper bracket; and a second plurality of balls accommodated rollingly within a second space delimited by the first side wall of the lower rail, the first top wall of the lower rail, the first side wall of the stopper bracket and the upturned wall of the upper bracket.

3. The vehicle seat slide mechanism as claimed in claim 2, wherein said first and second side walls of the stopper bracket are joined together by means of a bottom wall lying widthwise of the upper rail.

4. The vehicle seat slide mechanism as claimed in claim 3, wherein said stopper bracket also includes at least one lateral wing extending from one of respective upper edges of the first and second side walls of the stopper bracket so as to protrude towards the adjacent side wall of the lower rail.

5. The vehicle seat slide mechanism as claimed in claim 3, wherein said stopper bracket has an engagement area for engagement with a lock plate which forms a part of a seat slide lock mechanism.

6. The vehicle seat slide mechanism as claimed in claim 2, wherein said stopper bracket also includes at least one lateral wing extending from one of respective upper edges of the first and second side walls of the stopper bracket so as to protrude towards the adjacent side wall of the lower rail.

7. The vehicle seat slide mechanism as claimed in claim 2, wherein said stopper bracket has an engagement area for engagement with a lock plate which forms a part of a seat slide lock mechanism.

* * * * *